Patented Aug. 3, 1926.

1,594,864

UNITED STATES PATENT OFFICE.

ARTHUR ZITSCHER AND ROBERT SCHMITT, OF OFFENBACH-ON-THE-MAIN, GERMANY, ASSIGNORS TO L. G. FARBENINDUSTRIE AKTIENGESELLSCHAFT, OF FRANKFORT-ON-THE-MAIN, GERMANY.

DI-ACYLACETYL-DIAMINO COMPOUNDS OF THE DIARYL SERIES AND PROCESS OF MAKING SAME.

No Drawing. Application filed May 15, 1923, Serial No. 639,213, and in Germany August 28, 1922.

Our invention relates to a process of making di-acylacetyl-diamino compounds of the general formula:

Y.CO.CH$_2$.CO.NH.X.NH.CO.CH$_2$.CO.Y, wherein X means a diarylresidue, Y any radicle of the hydrocarbon series containing at least one and not more than six carbon atoms, aliphatic as well aromatic radicles being included under this term, said process consisting in reacting upon diamino bases of the diaryl series acylacetic acid esters, such as acetoacetic acid ester or its homologues or analogues, in the presence of a solvent or diluent.

In the Monatshefte für Chemie, Vol. 19, page 693, Heidrich has described di-acetoacetylbenzidin, obtained by heating benzidin with acetoacetic acid ester at 110° to not over 120°. (All temperatures in this specification are given in centigrade degrees.) But according to Heidrich's method a large amount of by-products is always formed, and therefore a complicated rectification is necessary for obtaining the di-acetoacetylbenzidin in a serviceable form. The yield is therefore only about 10 to 15 p. c. of the theoretical yield. Besides by increasing the temperature a little over 120° "the produce becomes easily resinous", as Heidrich describes, so that "therefrom not a particle of a serviceable product is obtained" (page 693, lines 20–22).

By using the various solvents or diluents such as e. g. hydrocarbons of the benzene series, chlorobenzene, nitrobenzene, naphthalene or a great surplus of the acylacetic acid ester used for our process generally the di-acylacetyl-diamino compounds of the diaryl series are obtained in a good yield and of an excellent purity. Without closely limiting the temperature of the reaction the products are obtained free from resinous bodies. Besides benzidin itself in this manner tolidin, dianisidin, dichlorobenzidin, nitrobenzidin, nitrotolidin and other bases of the diaryl series can be condensed with acetoacetic acid ester and its homologues and analogues, such as e. g. benzoylacetic acid ester.

The di-acylacetyl-diarylamines, which, with the exception of di-acetoacetyl-benzidin, constitute new compounds are important intermediate products for the manufacture of azodyestuffs.

The following examples illustrate the invention, the parts being by weight.

Example 1.

Into a boiling mixture of 150 parts of acetoacetic acid ester and 800 parts of chlorobenzene 71 parts of ortho-tolidin are poured while stirring. The mixture is kept boiling, until the splitting off of alcohol is finished. After cooling down the separated pulp of crystals is filtered and dried. If necessary some amin, which has not reacted, is removed by means of dilute hydrochloric acid and 101 parts, that is 80 p. c. of the theoretical yield, of di-aceto-acetyl-ortho-tolidin are obtained as a crystal powder, almost colorless and melting at 200°. Crystallized from alcohol it is obtained in fine lustrous needles, melting at 204–205° (not corrected) under decomposition. It is soluble in alcohol, glacial acetic acid and nitrobenzene, less soluble in acetone and acetic acid ester, insoluble in benzene, ether and carbon tetrachloride, having probably the formula:

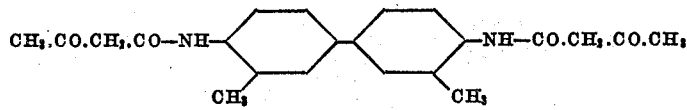

Example 2.

61 parts of benzidin are dissolved in 850 parts of solvent naphtha, and to the boiling solution 130 parts of acetoacetic acid ester are added slowly while stirring. The mixture is kept boiling, until the splitting off of alcohol is finished. After cooling down, the separated product of reaction is filtered, dried and rectified in the manner described in Example 1. 82 parts, that is 70 p. c. of the theoretical yield, of di-acetoacetyl-benzidin are obtained, melting, when crystallized from glacial acetic acid, at 234–235° (not corrected) under decomposition.

When using toluene instead of solvent naphtha, the yield is a little smaller.

Example 3.

Into a mixture of 205 parts of acetoacetic acid ester and 200 parts of nitrobenzene, heated to 175–180°, 81.3 parts of dianisidin are poured while stirring. The mixture is held at 170–180°, until the reaction is finished. The pulp of crystals, formed after cooling down, is freed of nitrobenzene by ether or carbon tetrachloride and rectified, if necessary, in the same manner, as described in Example 1. By this treatment 96 parts of di-acetoacetyl-ortho-dianisidin, decomposing at 164°, that is 70 p. c. of the theoretical yield, are obtained. It forms from alcohol fine feebly yellowish needles, melting at 164–165° (not corrected) under decomposition. It is soluble in alcohol, glacial acetic acid and nitrobenzene, less soluble in benzene, insoluble in ether and carbon tetrachloride.

Example 4.

71 parts of ortho-tolidin are dissolved in 850 parts of solvent naphtha and to the boiling solution 130 parts of benzoylacetic acid ester are added. The mixture is kept boiling, until the reaction is finished, and di-benzoylacetyl-ortho-tolidin is isolated, as above described. The yield is 70 p. c. of the theoretical yield. Di-benzoylacetyl-ortho-tolidin is crystallized from dilute acetic acid in fine, colorless and lustrous needles, melting at 233° (not corrected) under decomposition. It is little soluble in alcohol and toluene, more soluble in glacial acetic acid and pyridine.

All these di-acylacetyl-diarylides are soluble in a dilute caustic soda solution.

With other bases and other di-acylacetic acid esters the reaction can be conducted in a similar manner.

The following table gives the properties of some of the compounds obtainable according to the present process:

| Di-acylacetyl compound. | Aspect. | Crystallized from— | Melting point °C. not corrected. | Solubility. |
|---|---|---|---|---|
| Di-acetoacetyl-ortho-tolidin. | Fine lustrous colorless needles. | Alcohol | 204–205° under decomposition. | Soluble in alcohol, glacial acetic acid and nitrobenzene, less soluble in acetone and acetic acid ester, insoluble in benzene, ether and carbon tetrachloride. |
| Di-acetoacetyl-ortho-ortho'-dichlorobenzidin. | Colorless flakes of crystals. | Dilute alcohol. | Decomposing at 145–147°. | Soluble in glacial acetic acid, acetic acid ester and acetone, less soluble in ether and benzene. |
| Di-acetoacetyl-meta-meta-di-chlorobenzidin. | Colorless needles, united to clusters. | Dilute alcohol. | Decomposing at 212°. | Soluble in glacial acetic acid, acetic acid ester and acetone, less soluble in ether and benzene. |
| Di-acetoacetyl-dianisidin. | Fine, feebly yellowish needles. | Alcohol | 164–165° under decomposition. | Soluble in alcohol, glacial acetic acid and nitrobenzene, less soluble in benzene, insoluble in ether and carbon tetrachloride. |
| Di-benzoylacetyl-benzidin. | Fine yellowish crystalline powder. | Dilute pyridin | 248° under decomposition. | Soluble in glacial acetic acid and pyridine, insoluble in ether. |
| Di-benzoylacetyl-ortho-tolidin. | Fine, colorless lustrous needles. | Dilute acetic acid. | 233° under decomposition. | Soluble in glacial acetic acid and pyridine, less soluble in alcohol and toluene. |

Now what we claim and desire to secure by Letters Patent is the following:—

1. A process of making di-acylacetyl-di-amino compound of the diaryl series consisting in heating diaminodiaryl bases with acylacetic acid esters in a diluent.

2. A process of making di-acylacetyl-di-amino compounds of the diaryl series, substituted in the diaryl residue, consisting in heating substituted diamino-diaryl bases with acylacetic acid esters in a diluent.

3. An new articles the di-acylacetyldi-amin compounds of the general formula:

$$Y.CO.CH_2.CO.NH.X.NH.CO.CH_2.CO.Y,$$

wherein X means a substituted diaryl residue, Y any radicle of the hydrocarbon series containing at least one and not more than six carbon atoms.

4. As a new article di-acetoacetyl-ortho-tolidin of the formula:

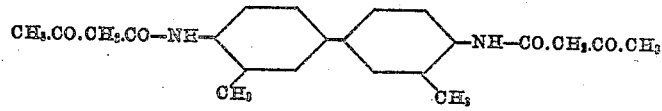

In testimony, that we claim the foregoing as our invention, we have signed our names, this 28th day of April 1923.

ARTHUR ZITSCHER. [L. S.]
ROBERT SCHMITT. [L. S.]